United States Patent [19]
Ishikura

[11] Patent Number: 5,191,675
[45] Date of Patent: Mar. 9, 1993

[54] CASTER MECHANISM FOR CARRIAGE
[75] Inventor: Takashi Ishikura, Tokyo, Japan
[73] Assignee: Combi Corporation, Tokyo, Japan
[21] Appl. No.: 750,688
[22] Filed: Aug. 27, 1991
[30] Foreign Application Priority Data
Sep. 27, 1990 [JP] Japan .............................. 2-100204[U]
[51] Int. Cl.⁵ .............................................. B60B 33/00
[52] U.S. Cl. ........................................ 16/35 R; 16/38
[58] Field of Search ...................... 16/35 R, 38, 39, 29

[56] References Cited
U.S. PATENT DOCUMENTS

| | | | |
|---|---|---|---|
| 4,637,093 | 1/1987 | Kassai | 16/35 R |
| 4,759,098 | 7/1988 | Ko | 16/35 R |
| 4,773,124 | 9/1988 | Nakao et al. | 16/35 R |
| 4,805,259 | 2/1989 | Kassai | 16/35 R |
| 4,835,815 | 6/1989 | Mellwig et al. | 16/35 R |
| 4,985,960 | 1/1991 | Zun | 16/35 R |

FOREIGN PATENT DOCUMENTS

| | | |
|---|---|---|
| 0263596 | 4/1988 | European Pat. Off. |
| 3212994 | 10/1983 | Fed. Rep. of Germany ..... 16/35 R |
| 3519855 | 12/1986 | Fed. Rep. of Germany . |
| 63-61601 | 3/1988 | Japan . |
| 63-93602 | 4/1988 | Japan . |
| 2143729 | 7/1984 | United Kingdom . |

Primary Examiner—Lowell A. Larson
Assistant Examiner—Michael J. McKeon
Attorney, Agent, or Firm—Sughrue, Mion, Zinn, Macpeak & Seas

[57] ABSTRACT

A caster mechanism for a carriage having foot rods a, b includes a stopper mechanism 3 fixedly secured to a lower end of each foot rod. A wheel support mechanism 2 is rotatably positioned below the stopper mechanism, and includes an engagement bracket 1 extending parallel to the stopper mechanism. The engagement bracket has an engagement fitting portion 12 formed at a first end of an arm plate 11 having a predetermined length. The stopper mechanism also has an actuating lever 8 at a first end of a base plate 34 having a predetermined length, which is adapted to turn upwardly and downwardly about an end thereof. An engagement member 7 adapted to turn up and down in operative association with the actuating lever is positioned below the first end of the base plate. The engagement member and the engagement fitting portion are simultaneously engaged or disengaged.

22 Claims, 5 Drawing Sheets

CASTER MECHANISM FOR CARRIAGE

The present invention relates generally to a caster mechanism for a baby carriage, and more particularly to a caster mechanism constructed to restrict the turning movement of the wheels for steering the carriage.

BACKGROUND OF THE INVENTION

To improve riding comfortability of a carriage, caster mechanisms have been used extensively. In certain cases, caster mechanisms are used only for improving the carriage's riding comfortability by serving as a shock absorber. In other cases, the caster mechanism is used not only for its shock absorbing characteristics, but also for its steering characteristics. Generally, in the former case, the caster mechanism is employed with the rear wheels of the carriage, and in the latter case, the caster mechanism is employed with the front wheels.

By employing caster mechanisms in the above-described manner, no problems occur when the baby carriage moves in a specific direction. Recently, the baby carriage has been modified so that a push handle can be changed easily between a forward and/or a rearward direction relative to the carriage seat. Thus, the baby carriage can be pushed while the operator faces the baby's back or while facing, the baby's front. With this arrangement, wheels located forwardly of the push handle are referred to as "front wheels", while wheels located rearwardly thereof are referred to as "rear wheels". Thus, the front wheels cannot definitely be distinguished from the rear wheels based simply on the orientation of the carriage.

When the aforementioned construction is employed for the carriage, caster mechanisms employed for both front and rear wheels must have not only an excellent shock absorbing characteristic but also an excellent steering capability. Additionally, as a practical matter, an excellent turning movement property must be exhibited for steering the wheels located forwardly of the push handle, and turning movement of the wheels located rearwardly of the push handle is inhibited for steering the wheel by a stopper unit arranged for each wheel.

To meet the foregoing requirements, a caster mechanism having a stopper mechanism added thereto has been hitherto developed, as disclosed in Japanese Kokais Nos. 63-61601 and 63-93602. However, these conventional caster mechanisms have the following drawbacks.

(1) The conventional caster mechanism has a stopper holder with an engagement groove having a stopper fitted thereto which is secured to a junction where each foot rod of the carriage is coupled to the caster mechanism. Moreover, a foremost engagement portion of the stopper formed to turn up and down on the caster side is fitted to the engagement groove of the stopper. Another stopper is arranged at the central part of the turning movement of each wheel.

As the wheels rotate, turning resistance results from contact with the ground causing each wheel to deviate from its initial position. To suppress any positional deviation of the wheels, the engagement state, e.g., the caster mechanism is operatively engaged with the foot rod, must be maintained reliably. However, since the conventional caster mechanism has the stopper mechanism positioned where resistance caused by wheel contact with the ground is concentrated, slight vibrations (positional deviation) are always generated by the wheels, resulting in the carriage having poor riding comfortability. Additionally, suppressing the positional deviation of the wheels is difficult, as a practical matter.

(2) Since the conventional caster mechanism is independently secured to the lower end of each foot rod without any operative association between the front wheels secured to the front foot rods and between the rear wheels secured to the rear foot rods, two stopper mechanisms arranged for a right-hand wheel on the rear wheel side and a left-hand wheel on the rear wheel side are separately actuated, when stopper mechanisms for a caster mechanism arranged for the two rear wheels are actuated such that the two rear wheels serve as wheels for the rear side.

(3) In the conventional baby carriage disclosed in Japanese Kokai No. 63-93602, no turning inhibition is performed to allow caster mechanisms to orient both the front and rear wheels in a specific direction. Thus, the caster mechanisms arranged for the rear wheels do not swing toward the rear side relative to the forward movement direction of the carriage when the rear wheels serve as wheels on the rear side when the baby carriage is conventionally used (see variation of the operative state from the position shown in FIG. 15 to the position shown in FIG. 16).

With this construction, the carriage cannot be folded while inoperative unless the direction of the wheel orienting toward the rear side is shifted to a direction conveniently employable for performing a carriage folding operation.

SUMMARY OF THE INVENTION

In view of the foregoing problems, an object of the invention is to provide a caster mechanism for a baby carriage wherein a stopper mechanism, e.g., a mechanism for maintaining the operative state for interrupting turning movement of each wheel, is arranged at a position remote from the central part of the wheel so that a firm engagement results from a small magnitude of engaging force.

A further object of the present invention includes providing a caster mechanism for a carriage wherein one of the stopper mechanisms arranged for a caster mechanism for one of the left and right wheels is actuated simultaneously when the other of the stopper mechanisms is actuated.

Another object of the present invention is to provide a caster mechanism for a carriage wherein when a main body of the carriage is folded to become inoperative, the caster mechanism orients toward the central part of the carriage, i.e., the inside of the carriage, and thus the carriage can be folded compactly to become inoperative.

To accomplish the above and other objects, the present invention provides a caster mechanism for a carriage which includes a stopper mechanism fixedly secured to the lower end of each foot rod of the carriage and a wheel support mechanism rotatably arranged below the stopper mechanism. The wheel support mechanism includes an engagement bracket extending parallel to the stopper mechanism at the upper part thereof, and having an engagement fitting portion formed at the foremost end of an arm plate having a predetermined length. An actuating lever at the foremost end of a base plate having a predetermined length, is adapted to turn up and down about its base end. An engagement member adapted to turn up and down in association with the actuating lever is disposed below the fore end part of the base plate. The engagement member and the engagement fitting portion are simultaneously engaged or disengaged.

BRIEF DESCRIPTION OF THE DRAWINGS

FIG. 4 is a side view of the caster mechanism according to the embodiment of the present invention shown in a disassembled state.

DETAILED DESCRIPTION OF THE PREFERRED EMBODIMENT

Hereinafter, a preferred embodiment of the present invention will be described in detail with reference to the accompanying drawings.

Figure 1:
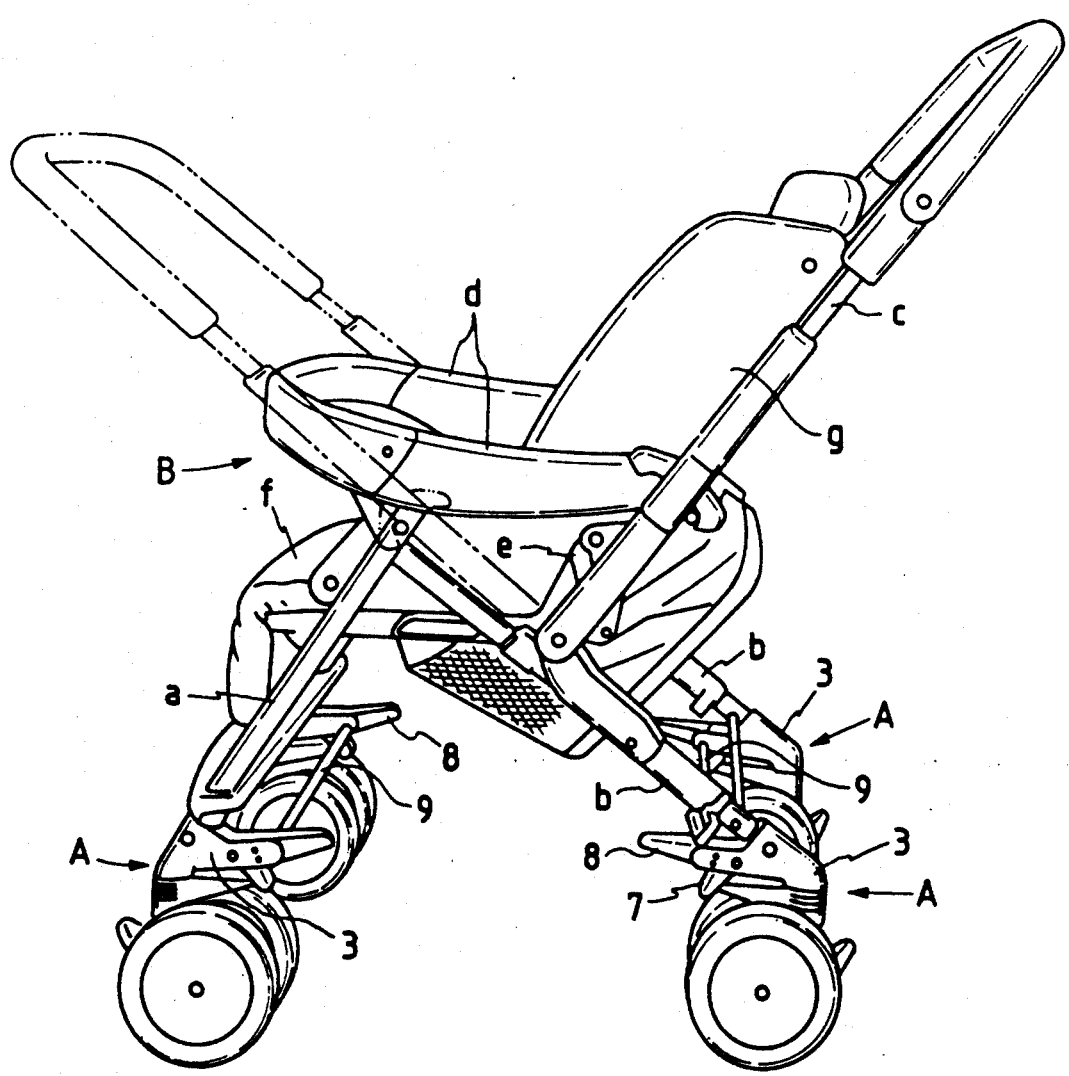
FIG. 1 is a perspective view of a carriage to which the present invention is applied.

Referring to FIG. 1, a baby carriage B includes front foot rods a, rear foot rods b, a hand push rod c and an elbow rest rod d. Rods a-d are pivotally connected together to constitute a foldable carriage body. The elbow rest rod d is bridged between a pivotal portion at which the upper ends of the front foot rods a and the rear foot rods b are pivotally united together and support rods e upwardly extending from the intermediate parts of the rear foot rods b. A shoulder rest portion g having an adjustable tilting angle is arranged at the rear end of a seat portion f.

The carriage B includes four casters A, each caster A including a stopper mechanism 3 secured to the lowermost end of the front or rear foot rod a, b, respectively, and a wheel support mechanism 2 including an engagement bracket 1 extending parallel to the stopper mechanism 3.

Figure 2:
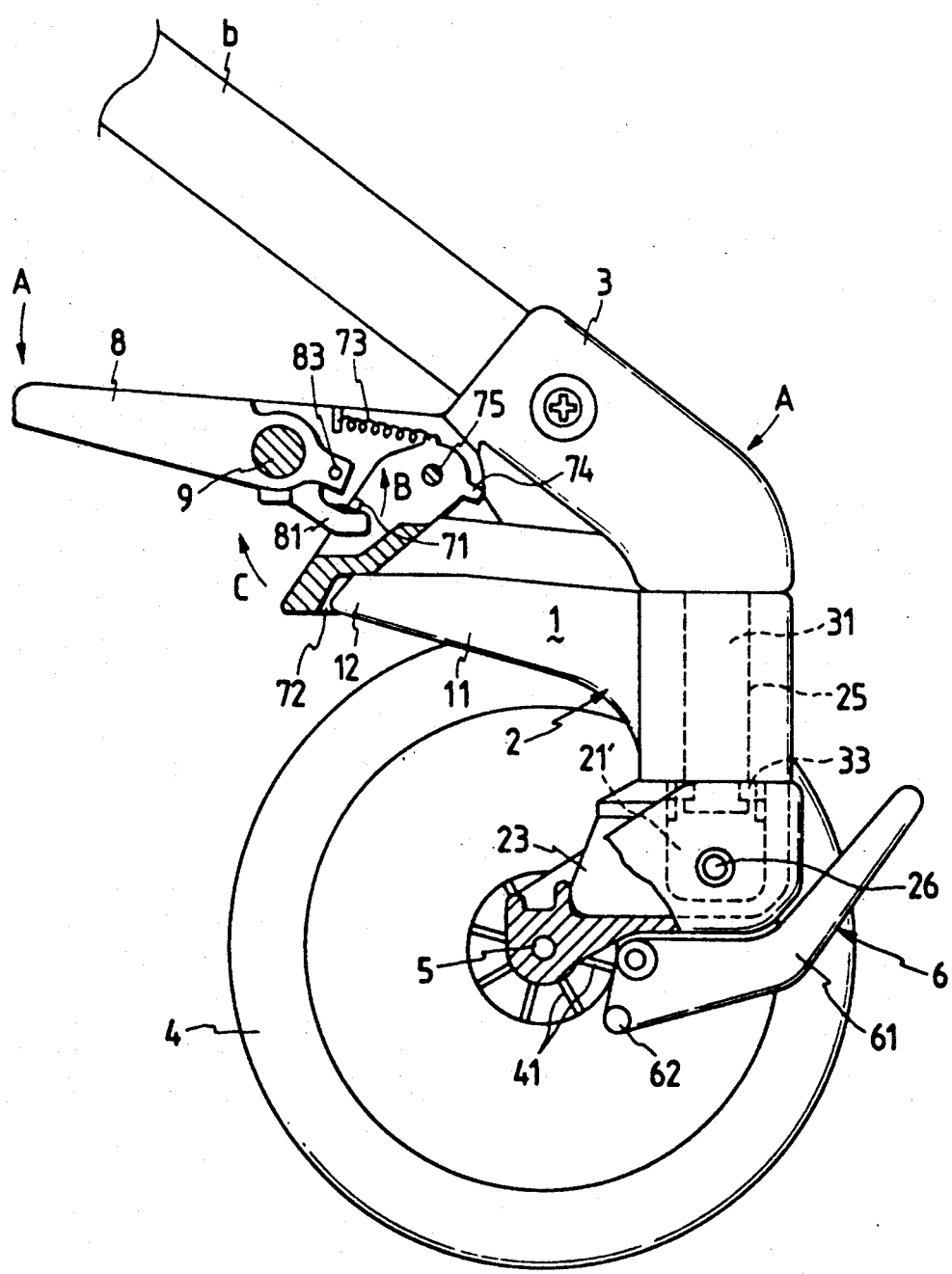
FIG. 2 is an enlarged side view of an essential part of the carriage, illustrating a stopper mechanism in an actuated position.

Referring to FIG. 2 and looking at the wheel support mechanism 2 in greater detail, a support body 21 is integrated with the engagement bracket 1 and a pedestal 22 is pivotally held by arm plates 21' formed at the lowermost end of the support body 21. A shock absorber 23 molded of an elastomeric material is interposed between the support body 21 and the pedestal 22. Additionally, an insert hole 24 through which a wheel shaft 5 is inserted while extending through the central part of a wheel 4 is formed at the lower end part of the pedestal 22.

As the wheels are displaced in the upward/downward direction, the above-described wheel support mechanism 2 absorbs shock by pivotal displacement of the pedestal 22 about a pivotal portion 26 by the arm plates 21' through which the wheel shaft 5 extends.

Since a support shaft 31 extending downwardly of the stopper mechanism 3 is rotatably inserted through an insert hole 25 on the support body 21, the entire support mechanism 2 swings upwardly/downwardly as the wheels are displaced upwardly/ downwardly.

A support shaft insert hole 25 is drilled through the rear end part of the support body 21 in the vertical direction, and allows the support shaft 31 extending below the stopper mechanism 3 to be inserted therethrough.

The support shaft 31 extending below the stopper mechanism 3 is slightly longer than the support shaft insert hole 25. An annular fitting groove 32 is formed at the lower end of the support shaft 31 to fit an engagement washer 33 around the annular fitting groove 32.

Part of the support shaft 31 protrudes outside of the lower surface of the support shaft insert hole 25, and the engagement 15 washer 33 is then fitted around the annular engagement groove 32. This assures that the support shaft 31 remains connected to the support shaft insert hole 25.

Figure 3:
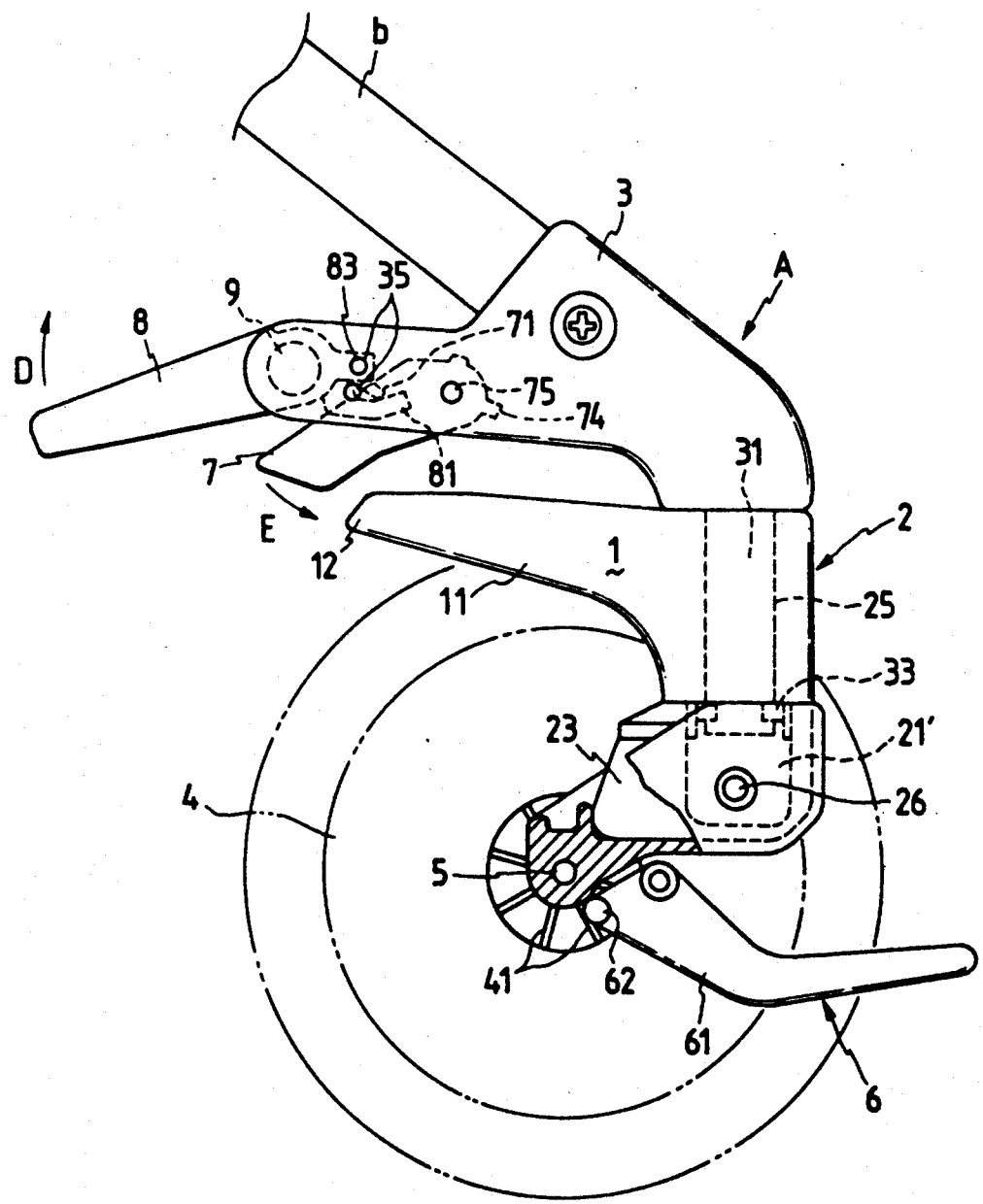
FIG. 3 ; is an enlarged side view similar to FIG. 2, illustrating the stopper mechanism being disengaged.
Figures 4A, 4B:
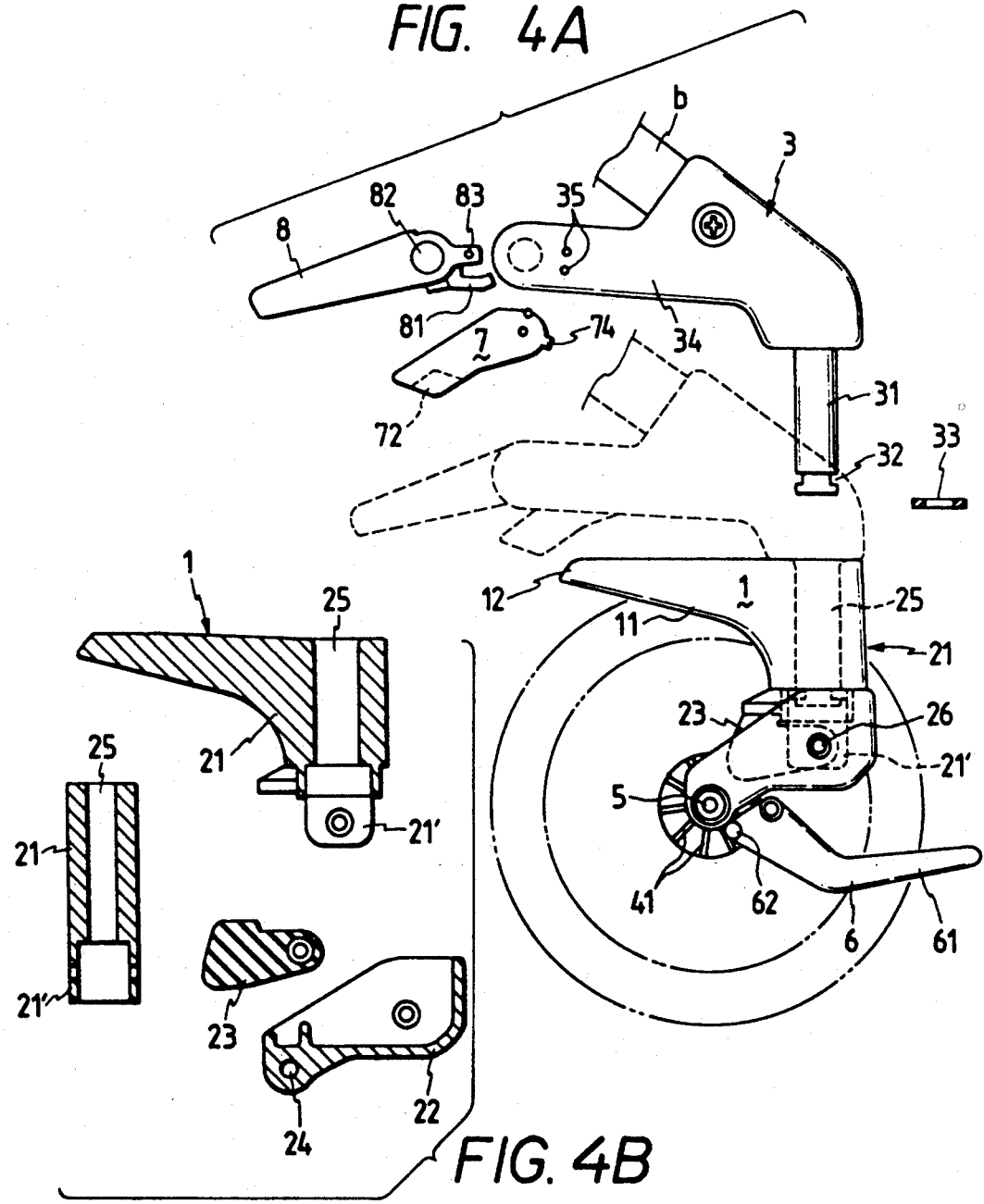
FIG. 4B is a side view of a lower portion of the caster mechanism according to the embodiment of the present invention shown in a disassembled state.

Referring to FIG. 3, brake 6 brakes the wheel 4 and prevents it from being rotated when the carriage is parked. More specifically, an engagement rod 62 at the foremost end of a brake arm 61 engages the intermediate part of one of a plurality of engagement flanges 41 each radially extending from the wheel shaft 5.

The engagement bracket 1 integrated with the support body 21 can partially expand in the transverse direction. The foremost end of the arm plate 11 of the engagement bracket 1 is an engagement fitting portion 12 for an engagement member 7 which is turnably mounted on the stopper mechanism 3.

The engagement fitting portion 12 preferably has a sectional contour having a tapered fore end. With such an arrangement, engagement of the engagement fitting portion 12 with the engagement member 7 can be achieved easily.

The stopper mechanism 3 is constructed so that the base end of an actuating lever 8 is turnably engaged with the foremost end of a base plate 34 having a predetermined length and the base end of the engagement member 7 is pivotally supported at the position near the foremost end of the base plate 34.

An engagement pawl 81 for raising up the fore end part of the engagement member 7 projects from the lower surface of the actuating lever 8 at the base end part thereof to contact the lower surface of an engagement rod 71 extending across the engagement member 7 in the transverse direction. As shown in FIG. 2, the engagement pawl 81 has a flattened V-shaped cross sectional contour.

The position assumed by the engagement rod 71 on the engagement member 7 is determined slightly inside of (i.e., slightly upwardly of) the start position for the turning movement path of the engagement pawl 81 of the actuating lever 8 about a common shaft 9. Thus, when the actuating lever 8 is downwardly turned in the direction of arrow A shown in FIG. 2, the engagement pawl 81 of the actuating lever 8 is raised, thereby causing the engagement member 7 to be raised via contact of the engagement pawl 81 with the engagement rod 71.

A recess 72 is formed at the lower surface of the engagement member 7 at the fore end part thereof so that the engagement fitting portion 12 of the engagement bracket 1 engages the recess 72.

The engagement member 7 raised up by the actuating lever 8 is normally biased by a coil spring 73 coupled between the upper end of the engagement member 7 and the inner surface of the base plate 34 such that the foremost end of the engagement member 7 is always displaced downwardly. With such a construction, the stopper mechanism 3 is always actuated in a direction to be engaged with the engagement bracket 1.

As shown in FIGS. 2-3, a stop projection 74 is formed at the upper end of the engagement member 7.

As the lower end part of the engagement member 7 (corresponding to the engagement recess 72) is downwardly displaced in the engagement direction, the stop projection 74 contacts the lower surface of the base plate 34 to prevent excessive downward displacement of the engagement member 7.

Additionally, an engagement projection 83 is formed on the side surface at the base end part of the actuating lever 8, and maintains an attitude of the actuating lever 8 when it is turned upwardly or downwardly. Specifically, one of the attitudes is maintained when the engagement projection 8 is selectively fitted into one of two fitting holes 35 on the side surface of the base plate 34 at the left-hand end part thereof.

The positions of the fitting holes 35 on the base plate 34 are determined depending on a locus of turning movement of the actuating lever 8 in the upward/downward direction. The position of the lower fitting hole 35 is determined corresponding to the operative state of actuating lever 8 held with a horizontal attitude, as shown in FIG. 2. The position of upper fitting hole 35 is determined corresponding to the operative state of actuating lever 8 which is turned downwardly, as shown in FIG. 3.

By normally biasing the engagement member 7 downwardly with the coil spring 73, the rear wheels are prevented from being unexpectedly displaced upwardly and downwardly when the engagement member 7 and the engagement fitting portion 12 are disengaged, when the caster mechanism A is arranged on the rear wheel side.

In FIG. 2, a common shaft 9 simultaneously turns two actuating levers 8 for two caster mechanisms A arranged for an opposing pair of wheels in the upward/downward direction. The right-hand end of the common shaft 9 is immovably fitted into a fitting hole 82 on the actuating lever 8 arranged for the right-hand caster mechanism A, while the left-hand end of the common shaft 9 is immovably fitted into a fitting hole 82 on the actuating lever 8 arranged for the left-hand caster mechanism A. Each fitting hole 82 also is used as a pivotal hole when the actuating lever 8 is pivotally mounted on the base plate 34.

Hereinafter, the operation of the above-described caster mechanism according to an embodiment of the present invention will be described.

USAGE OF THE STOPPER MECHANISM

With respect to the wheels 4 located on the front wheel side, when the stopper mechanism 3 is disengaged the wheels 4 can freely be turned and steered. In contrast, with respect to wheels 4 located on the rear wheel side, when the stopper mechanism 3 is engaged, turning movement of the wheels 4 on the rear wheel side is inhibited, and the wheel 4 is rotated only forwardly.

When the stopper mechanism 3 is used in the above-described manner, since the wheels 4 on the rear wheel side which are inhibited by the stopper mechanism 3 are constructed so that the engagement bracket 1 is held in the engaged state toward the inside of the carriage, the wheels 4 on the front and rear sides are displaced toward the inside of the carriage. However, the wheels 4 are not displaced when the raising-up position of the push handle varies.

OPERATION FOR DISENGAGING THE STOPPER MECHANISM 3

(1) When the actuating lever 8 held in the engaged state is depressed (in the direction of arrow A in FIG. 2), the engagement pawl 81 at the base end of the actuating lever 8 is turned upwardly about the common shaft 9 (in the direction of arrow B in FIG. 2), so that the foremost end of the engagement pawl 81 contacts the lower face of the engagement rod 71 on the engagement member 7.

(2) As the engagement rod 71 is raised up further by continuously depressing the actuating lever 8, the foremost end of the engagement member 7 is increasingly raised up in the direction of arrow C in FIG. 2, whereby the recess 72 at the fore end part of the engagement member 7 and the engagement fitting portion 12 of the engagement bracket 1 are disengaged.

(3) Once the engagement fitting portion 12 has been disengaged, the inhibition of the turning movement of the engagement bracket 1 is canceled. Thus, the front wheels can be steered properly while they are freely turned.

OPERATION FOR ENGAGING THE STOPPER MECHANISM 3

(1) When the stopper mechanism 3 is to be engaged, an operation reverse to that described above is performed. Specifically, when the actuating lever 8 is raised in the direction of arrow D in FIG. 3, the engagement pawl 81 of the engagement lever 8 is displaced downwardly with the common shaft 9 as a fulcrum and the engagement rod 71 which is contacting the engagement pawl 81 is released from the raised state.

(2) Since the engagement member 7 is normally biased downwardly by the resilient force of the spring 73, the engaging member 7 is immediately lowered in the direction of arrow E in FIG. 3 after the engagement rod 71 is released from the raised state, whereby the engagement fitting portion 12 of the engagement bracket 1 is engaged with the recess 72 at the fore end part of the engagement member 7.

(3) Since the engagement bracket including the engagement fitting portion 12 at the foremost end of the arm plate 11 is constructed integrally at the upper end of the wheel support mechanism 2, the engagement bracket 1 can be turned freely together with the wheel support mechanism 2.

In certain cases, the engagement bracket is absent from the position where the engagement member 7 is displaced downwardly. In this case, when the engagement bracket 1 reaches the position below the engagement member 7 as the wheel 4 is turned while the engagement member 7 is kept in the lowered state, the engagement fitting portion 12 automatically engages the recess 72 while raising up the foremost end of the engagement member 7. Consequently, a desired engagement effect can be exhibited.

With the above-described caster mechanism of the present invention, the following advantages are achieved.

(1) The stopper mechanism 3 can be actuated merely by a one-touch operation. More specifically, when the stopper mechanism 3 is to be actuated, a one-touch operation allows the actuating lever 8 arranged at the foremost end of the stopper mechanism 3 to turn upwardly/downwardly to be raised, or the actuating lever 8 which has been held in the raised state to be downwardly displaced. Therefore, stopper mechanism 3 can be easily actuated as compared to the conventional caster mechanism.

(2) Even when the engagement fitting portion 12 is absent below the engagement member 7 which has been downwardly displaced by actuation of the actuating lever 8, the engagement fitting portion 12 is automatically engaged with the recess 72 while raising up the foremost end of the engagement member 7 when the engagement bracket 1 reaches the position below the engagement member 7 by turning movement of the wheel 4.

(3) Since the stopper mechanism 3 disposed at the lower end of each foot rod and the engagement bracket 1 disposed above the wheel support mechanism 2 are constructed in a single structural unit having a long stroke, engaging force generated by the stopper mechanism 3 engaging the engagement bracket 1 (i.e., the fitting portion at which the engagement fitting portion 12 is engaged with the recess 72 at the foremost end of the engagement member 7) is located remotely from the wheel shaft 5.

Consequently, although a small engagement force is generated at the engagement location similarly to the operational principle of a lever, a firm engagement results. Additionally, undesirable wheel vibration unavoidable with the conventional caster mechanism can be suppressed effectively.

(4) Since each actuating lever 8 constituting the stopper mechanism 3 is mounted on the common shaft 9, either the left-hand wheel or the right-hand wheel can be engaged or disengaged merely by actuating one actuating lever 8 (e.g., one lever for either the left-hand wheel or the right-hand wheel).

(5) With the conventional carriage having caster mechanisms arranged on both the front and rear wheels without any particular inhibition on carriage movement in a specific direction, the carriage cannot be folded to become inoperative unless the movement direction of the wheels is shifted to a direction conveniently employable for performing a folding operation.

Figure 5:
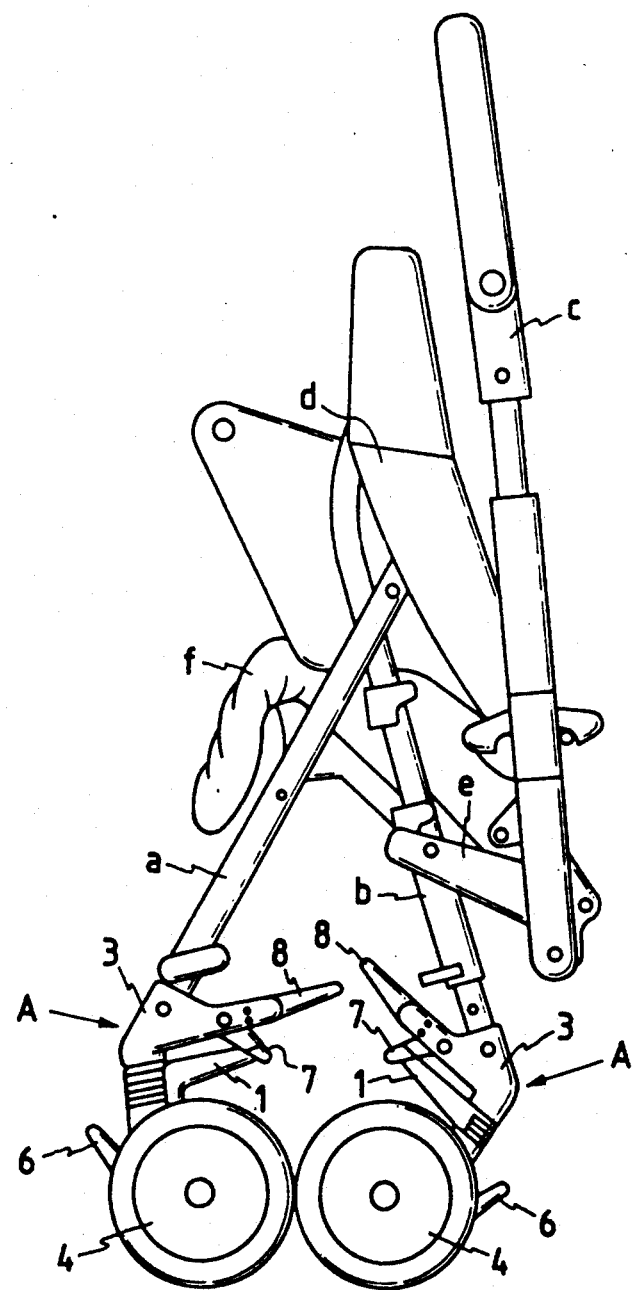
FIG. 5 is a side view of the carriage, illustrating the carriage in a folded position.

In contrast, the present invention has a stopper mechanism 3 arranged at the lower ends of the front and rear foot rods a, b respectively, constructed to always orient toward the inside of the carriage B when in use. Thus, the carriage B can be folded to become inoperative while all the stopper mechanisms 3 are located on the inside of the carriage B, as shown in FIG. 5. Consequently, the carriage B has substantially improved practicality.

While a certain preferred embodiment has been shown and described, many changes and modifications within the spirit of the invention will be apparent to those of working skill in this technical field. Thus, the scope of the invention should be considered as limited only by the appended claims.

What is claimed is:

1. A caster mechanism adapted for use with a carriage having a plurality of wheels and a foot rod coupled to each wheel, said caster mechanism comprising:
a stopper mechanism fixedly secured to each foot rod of said carriage; and
a wheel support mechanism rotatably positioned below said stopper mechanism, said wheel support mechanism including an engagement bracket extending parallel to said stopper mechanism, said engagement bracket having an arm plate and an engagement fitting portion formed at a first end of said arm plate,
wherein said stopper mechanism comprises a base plate, an actuating lever coupled to a first end of said base plate and adapted to turn upwardly and downwardly about an end thereof, and an engagement member adapted to turn up and down in operative association with said actuating lever and positioned below said first end of said base plate to selectively engage said engagement fitting portion, said engagement member and said engagement fitting portion simultaneously being engaged or disengaged together such that said wheel either is selectively fixed in a predetermined orientation or is steerable,
said caster mechanism further comprising a rod positioned on said engagement member; and
means for selectively engaging and disengaging said rod, said engaging means being formed on said actuating lever.

2. A caster mechanism as claimed in claim 1, further comprising a recess formed at an end of said engagement member such that said engagement fitting portion of said engagement bracket engages said recess.

3. A caster mechanism as claimed in claim 2, wherein said recess is formed at a lower surface of said engagement member at said end thereof.

4. A caster mechanism as claimed in claim 1, wherein an actuating lever of a first caster mechanism is mounted on a shaft common to a second caster mechanism.

5. A caster mechanism as claimed in claim 1, wherein said stopper mechanism is fixedly secured to a lower end of each foot rod.

6. A caster mechanism as claimed in claim 1, further comprising a braking means for braking said carriage, said braking means being coupled to at least one wheel of said carriage.

7. A caster mechanism as claimed in claim 1, wherein said engagement fitting portion has a tapered end for engagement with said engagement member.

8. A caster mechanism as claimed in claim 1, wherein said engagement member is pivotally supported at a position adjacent said first end of said base plate.

9. A caster mechanism as claimed in claim 1, further comprising a spring means for biasing said engagement member.

10. A caster mechanism as claimed in claim 1, wherein said engagement member includes a stop projection formed at an end thereof, and whereby when said engagement member is displaced downwardly, said stop projection contacts a surface of said base plate, thereby to prevent further displacement of said engagement member.

11. A caster mechanism as claimed in claim 1, wherein an actuating lever of a first stopper mechanism associated with a first wheel of said carriage and an actuating lever of a second stopper mechanism associated with a second wheel of said carriage are mounted on a common shaft.

12. A caster mechanism as claimed in claim 1, wherein said engagement bracket is constructed integrally at an end of said wheel support mechanism to be turned together therewith.

13. A caster mechanism as claimed in claim 1, whereby when said carriage is in a folded state, an actuating lever of a first stopper means for a first wheel of said carriage is locked in a position opposing an actuating lever of a second stopper means for a second wheel of said carriage.

14. A caster mechanism adapted of use with a carriage having a plurality of wheels and a foot rod coupled to each wheel, said caster mechanism comprising:
a stopper mechanism fixedly secured to each foot rod of said carriage; and
a wheel support mechanism rotatably positioned below said stopper mechanism, said wheel support mechanism including an engagement bracket extending parallel to said stopper mechanism, said engagement bracket having an arm plate and an engagement fitting portion formed at a first end of said arm plate,
wherein said stopper mechanism comprises a base plate, an actuating lever coupled to a first end of said base plate and adapted to turn upwardly and downwardly about an end thereof, and an engagement member adapted to turn up and down in operative association with said actuating lever and positioned below said first end of said base plate, said engagement member and said engagement fitting portion simultaneously being engaged or disengaged together,
said caster mechanism further comprising an engaging rod extending transversely across said engagement member, and an engagement pawl formed at a base end of said actuating lever and extending therefrom, said engagement pawl engaging or disengaging said engaging rod.

15. A caster mechanism as claimed in claim 2, further comprising a recess formed at an end of said engagement member such that said engagement fitting portion of said engagement bracket engages said recess.

16. A caster mechanism as claimed in claim 14, wherein said engagement pawl raises an end of said engagement member to contact said engagement member, said engagement pawl having a V-shaped cross-sectional contour.

17. A caster mechanism adapted for use with a carriage having a plurality of wheels and a foot rod coupled to each wheel, said caster mechanism comprising:
a stopper mechanism fixedly secured to each foot rod of said carriage; and
a wheel support mechanism rotatably positioned below said stopper mechanism, said wheel support mechanism including an engagement bracket extending parallel to said stopper mechanism, said engagement bracket having an arm plate and an engagement fitting portion formed at a first end of said arm plate,
wherein said stopper mechanism comprises a base plate, an actuating lever coupled to a first end of said base plate and adapted to turn upwardly and downwardly about an end thereof, and an engagement member adapted to turn up and down in operative association with said actuating lever and positioned below said first end of said base plate, said engagement member and said engagement fitting portion simultaneously being engaged or disengaged together, and
wherein said actuating lever includes a fitting projection, said actuating lever being rotatable, said stopper mechanism including fitting holes for engagement with said fitting projection of said actuating level, wherein said fitting holes are positioned on said stopper mechanism based on a locus of movement of said actuating lever.

18. A caster mechanism adapted for use with a carriage having a plurality of wheels and a foot rod coupled to each wheel, said caster mechanism comprising:
a stopper mechanism fixedly secured to each foot rod of said carriage; and
a wheel support mechanism rotatably positioned below said stopper mechanism, said wheel support mechanism including an engagement bracket extending parallel to said stopper mechanism, said engagement bracket having an arm plate and an engagement fitting portion formed at a first end of said arm plate,
wherein said stopper mechanism comprises a base plate, an actuating lever coupled to a first end of said base plate and adapted to turn upwardly and downwardly about an end thereof, and an engagement member adapted to turn up and down in operative association with said actuating lever and positioned below said first end of said base plate, said engagement member and said engagement fitting portion simultaneously being engaged or disengaged together, and
wherein said wheel support mechanism includes a support body integrated with said engagement bracket and having arm plates formed at an end of said support body, a pedestal pivotally held by said rm plates, and shock absorbing means interposed between said support body and said pedestal for absorbing vibration caused by movement of said carriage.

19. A caster mechanism as claimed in claim 18, wherein said wheel support mechanism further comprises an insert hole for receiving a wheel shaft, and a pivotal portion, wherein said pedestal pivotally displaces about said pivotal portion of said wheel support mechanism.

20. A caster mechanism adapted for use with a carriage having a plurality of wheels and foot rods connected to each of said wheels, said caster mechanism comprising:
stopper means fixedly secured to each foot rod of said carriage for restricting the turning movement of a wheel of said carriage associated therewith; and
wheel support means rotatably positioned below said stopper means for supporting each of said wheels, said wheel support means including an engagement bracket having an arm plate and an engagement fitting portion formed integrally with said arm plate,
wherein said stopper means comprises an actuating lever adapted to turn upwardly and downwardly, and an engagement member adapted to turn up and down in operative association with said actuating lever and positioned below said actuating lever to selectively engage said engagement fitting portion, said engagement member and said engagement fitting portion either being engaged or disengaged together such that said wheel is selectively fixed in a predetermined orientation or steerable,
said caster mechanism further comprising a rod positioned on said engagement member; and
means for selectively engaging and disengaging said rod, said engaging means being formed on said actuating lever.

21. A caster mechanism as claimed in claim 20, wherein an actuating lever of a first stopper means associated with a first wheel of said carriage and an actuating lever of a second stopper means associated with a second wheel of said carriage are mounted on a common shaft.

22. A caster mechanism as claimed in claim 20, whereby when said carriage is in a folded state, an actuating lever of a first stopper means for a first wheel opposes an actuating lever of a second stopper means for a second wheel of said carriage.

* * * * *